United States Patent [19]
Coops

[11] Patent Number: 4,835,378
[45] Date of Patent: May 30, 1989

[54] APPARATUS FOR OPTICALLY SCANNING A RADIATION-REFLECTIVE INFORMATION PLANE

[75] Inventor: Peter Coops, Eindhoven, Netherlands

[73] Assignee: U.S. Philips Corporation, New York, N.Y.

[21] Appl. No.: 135,787

[22] Filed: Dec. 21, 1987

[30] Foreign Application Priority Data

Sep. 21, 1987 [NL] Netherlands .................. 8702245

[51] Int. Cl.⁴ ............................................. G01J 1/20
[52] U.S. Cl. ..................................... 250/201; 369/45
[58] Field of Search ................. 250/201; 369/44–46

[56] References Cited

U.S. PATENT DOCUMENTS

| | | | |
|---|---|---|---|
| 4,665,310 | 5/1987 | Heemskerk | 250/201 |
| 4,672,187 | 6/1987 | Fujita et al. | 250/201 |
| 4,712,205 | 12/1987 | Smid et al. | 250/201 |
| 4,733,065 | 3/1988 | Hoshi et al. | 369/45 |

*Primary Examiner*—Edward P. Westin
*Assistant Examiner*—Khaled Shami
*Attorney, Agent, or Firm*—Algy Tamoshunas; Leroy Eason

[57] ABSTRACT

Apparatus for scanning a radiation-reflective information plane (2). A scanning beam of radiation (b) from a diode laser (4) is focused by an objective lens (6) on the information plane and the beam reflected therefrom is deflected by a composite diffraction grating (9) so as to form two asymmetrical radiation spots ($V_1$, $V_2$) respectively focused on respective pairs of photodiodes (18, 19; 20, 21). The relative outputs of the photodiodes in each pair control focusing of the scanning beam on the information plane. The photodiodes in each pair are separated by a strip (22′,23′) positioned so that it is at an acute angle to the line (22, 23) along which the asymmetrical reflected radiation spot formed on the relevant diode pair becomes displaced as a result of variations in the wavelength of the scanning beam. Such angle is set so the separating strip is on the line along which the center of the intensity distribution of such radiation spot becomes displaced as a result of such variations. Consequently, such variations do not affect the relative outputs of the photodiode pairs and so are prevented from affecting focusing of the scanning beam on the information plane.

4 Claims, 5 Drawing Sheets

APPARATUS FOR OPTICALLY SCANNING A RADIATION-REFLECTIVE INFORMATION PLANE

BACKGROUND OF THE INVENTION

1. Field of the Invention

The invention relates to an apparatus for optically scanning a radiation-reflective information plane, which apparatus comprises a diode laser supplying a scanning beam, an objective system for focussing the scanning beam to form a scanning spot in the information plane and for re-imaging the scanning spot on a composite radiation-sensitive detection system, and a composite diffraction element which is arranged in the radiation path between the diode laser and the objective system for deflecting the radiation beam reflected by the information surface to the radiation-sensitive detection system and for splitting said beam into a plurality of sub-beams forming a corresponding plurality of radiation spots on a corresponding plurality of detector pairs of the composite detection system.

2. Description of the Related Art

An apparatus of this type, which is in principle suitable for reading a pre-recorded optical record carrier and for optically recording such a record carrier, is known from U.S. Pat. No. 4,665,310. In this apparatus the composite diffraction element in the form of a diffraction grating performs two functions for which otherwise two separate elements are required. Firstly the grating ensures that the radiation which has been reflected by the information surface and which traverses the objective system is deflected from the path of the radiation emitted by the diode laser, so that a detection system can be arranged in the path of the reflected radiation. Secondly, the grating splits the reflected beam into two sub-beams required for generating a focussing error signal, i.e. a signal containing information about the magnitude and the direction of a deviation between the focal plane of the objective system and the information plane. Each of the sub-beams is associated with a separate detector pair, the signal representing the difference between the output signals of the detectors of the same pair being a measure of the focussing of the scanning beam on the information plane.

In the said record carrier the information is arranged in accordance with information tracks. If the bounding line between the two sub-gratings extends parallel to the track direction, it is possible, by determining the sum of the output signals of each detector pair and subtracting these sum signals from each other, to form a signal containing information about the magnitude and the direction of a deviation between the centre of the scanning spot and the central axis of the information track to be scanned.

In order to obtain the desired beam-splitting, the diffaction grating in the known apparatus comprises two subgratings having the same grating period, whilst the grating strips of the first sub-grating extend at a first angle and the grating strips of the second sub-grating extend at a second angle, which is equal but opposite to the first angle, to the line separating the two sub-gratings. Since a diffraction grating deflects an incident beam in a plane transversely to the direction of the grating lines, the part of the beam which is incident on one of the sub-gratings will be given a different direction than the part of the beam which is incident on the second sub-grating.

As set forth in U.S. Pat. No. 4,665,310 the grating design described in this patent is based on a previously proposed composite diffraction grating. This grating comprises two sub-gratings in which the grating strips of the one sub-grating have the same direction as those of the other sub-grating, but in which the grating periods of the two sub-gratings are different. Since the angle at which an incident beam is deflected by a grating depends on the grating period, the part of the beam incident on one of the sub-gratings is deflected at an angle which is different from the angle at which the part of the beam which is incident on the other sub-grating is deflected.

Satisfactory experience has been gained with scanning apparatus provided with these gratings. However, it has been found that when using a grating a deviation in the generated focussing error signal may occur which, it is true, remains within the range of tolerance laid down for this signal, but leaves only little room for possible other deviations. The last-mentioned deviations may be caused by mutual movements of the optical components, and by varying settings in the electronic processing circuit.

As is known the wavelength $\lambda$ of the radiation beams emitted by diode lasers which are frequently used in practice may vary, for example due to temperature variations. The wavelengths of individual diode lasers, which have been manufactured by means of the same process at different points of time, may also mutually differ. A wavelength variation of the scanning beam results in a variation of the angles at which the sub-beams are deflected by the sub-gratings, resulting in a change of the positions of the radiation spots on the detector pairs.

To prevent these position changes from affecting the generated focussing error signal, it has already been proposed to arrange the separating strips of each detector pair in such a way that the displacement of the radiation spots due to the wavelength variations occurs along these separating strips. However, the varying intensity distribution of these radiation spots has not been taken into account.

When correctly focussing the scanning beam on the information plane and in the case of the correct, or nominal wavelength of this beam, the sub-beams from the diffraction grating form radiation spots on their associated detector pairs, which spots have intensity distributions which are symmetrical with respect to these detector pairs. When varying the wavelength of the scanning beam, not only the positions of these radiation spots change but these spots also become asymmetrically larger in the direction transversely to the separating strips because the focussing of the sub-beams with respect to the associated detector pairs changes, even in the case of a constant and correct focussing of the scanning beam on the information plane. Then the fact that each sub-beam originates from a grating covering only half the exit pupil of the objective system, so that these sub-beams are asymmetrical, starts to play a role. The magnification of a radiation spot occurring as a result of the wavelength variation is asymmetrical, so that the centre of the intensity distribution of a radiation spot performs a movement with a movement component transversely to the separating strip of the associated detector pair. In the case of a wavelength variation there is therefore a change of the difference signal of the detectors associated with a pair, which change is interpreted by the focus servo-system as a focussing error of the scanning beam with respect to the information plane. The focus servo-system then starts to "correct" in such a way that the scanning spot is no longer focussed on the information plane in an optimum manner.

SUMMARY OF THE INVENTION

The invention has for its object to provide a solution to this novel problem. The apparatus according to the invention is characterized in that for each detector pair the separating strip between the two detectors extends at an acute angle to the line connecting the centre of the radiation emitting surface of the diode laser with the position assumed by the centre of the intensity distribution of the radiation spot formed on the relevant detector pair if the scanning beam is focussed on the information plane in an optimum manner.

The separating strip of each detector pair is then located in such a manner that the displacement of the centre of the intensity distribution of the associated radiation spot, which results from the wavelength variation, is effected along this separating strip, so that this displacement does not result in a change of the intensity distribution over the detectors and therefore has no influence on the focussing error signal.

The invention can be used in scanning apparatus in which the diffraction element is constituted by a grating composed of a plurality of sub-gratings.

The sub-gratings may comprise straight grating strips and they may have a constant grating period.

However, the apparatus is preferably characterized in that the sub-gratings have a varying grating period and in that the grating strips are curved.

When using a diffraction grating having a varying grating period, less stringent requirements need to be imposed on the mutual position accuracy of the diode laser and the detectors in the form of photodiodes, which is particularly important if the height, measured along the optical axis of the objective system, of the apparatus must be reduced. In addition, when using gratings having curved grating strips, it is possible by adapting the curvatures during manufacture of the composite grating, to correct for imaging errors such as coma and astigmatism, which may occur when using a diffraction grating having straight grating strips.

A first embodiment of an apparatus in which the composite grating comprises two sub-gratings and in which the grating strips of the one sub-grating have the same direction as those of the other sub-grating and the grating periods of the sub-gratings are different, and in which the detector pairs are juxtaposed in a direction parallel to the separating line between the sub-gratings is characterized in that the separating strips of the detector pairs extend at opposite angles to the said connection line.

A second embodiment of an apparatus using two subgratings having the same grating period, whilst the grating strips of the first sub-grating extend at a first angle and the grating strips of the second sub-grating extend at a second angle, which is equal but opposite to the first angle, to the separating line of the two sub-gratings, and in which the detector pairs are juxtaposed in a direction transversely to the direction of the said separating line is characterized in that the separating strips of the detector pairs extend at equally large but opposite angles to the said connection line.

The invention will now be described in greater detail by way of example with reference to the accompanying drawings in which.

DESCRIPTION OF THE PREFERRED EMBODIMENTS

Figure 1:
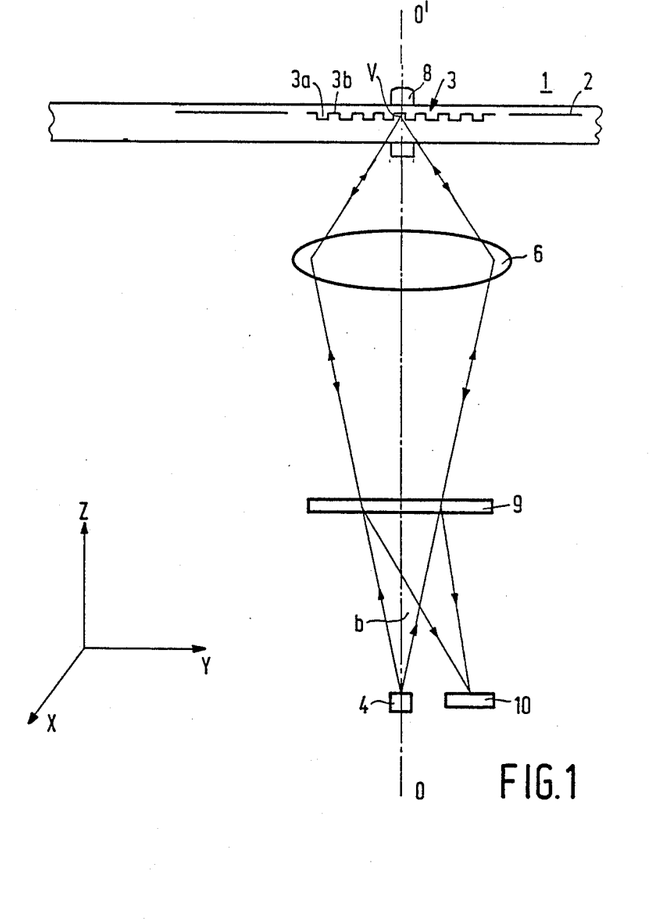
FIG. 1 shows diagrammatically an embodiment of a read apparatus which a diffraction grating.

FIG. 1 is a tangential cross-sectional view of a small part of an optical record carrier 1 having a radiation-reflecting information plane 2. This Figure shows one of the tracks 3 situated in the information plane 2. Such a track comprises information areas 3a alternating with intermediate areas 3b, whilst, for example the areas 3a are located at a height differing from that of the intermediate areas 3b. The information surface is scanned by a beam b emitted by a diode laser 4. This beam is focussed by an objective system 6 diagrammatically represented by a single lens, to form a tiny scanning spot V in the information plane. A separate collimator lens may be arranged ahead of the objective system. The imaging system may be alternatively formed by a combined collimator-objective system as is shown in FIG. 1. As the record carrier is rotated about an axis 8, which is parallel to the optical axis 00', a track 3 is scanned and the read beam is modulated by the information contained in this track. By moving the record carrier and the read unit comprising the source 4, the objective system 6 and the detection system 10 in a radial direction relative to one another, the entire information surface is scanned.

The beam which has been reflected and modulated by the information surface should be detected, which means that this beam should be separated from the beam emitted by the source 4. Therefore the apparatus should comprise a beamseparating element.

For reading an information structure with minute information details, for example of the order of 1 μm, an objective system having a large numerical aperture is required. The depth of focus of such an objective system is small. Since variations in the distance between the information plane 2 and the objective system 6 may occur which are larger than the depth of focus, steps have to be taken in order to detect that variations and, in response thereto, correct the focussing. To this end the apparatus may be provided with a beam splitter which splits the reflected beam into two sub-beams, and with, for example, two detector pairs of which a first pair co-operates with the first subbeam and the second pair co-operates with the second subbeam. The output signals of the detectors are processed to form, inter alia, a focus servo-signal.

As described in the Article "Optische Fokusfehlerdetektion" in "Neues aus der Technik", No. 6, 15 December 1980, page 3, beam separation and beam splitting can be effected by means of a single element, namely a transparent grating. This grating splits the beam which is reflected by the information surface 2 and which traverses the objective system 6 into a non-deflected zero-order subbeam and a plurality of first-order and higher-order subbeams. The grating parameters, specifically the ratio between the width of the grating strips and that of the intermediate strips and the depth and the shape of the grating grooves may be selected in such a way that a maximum quantity of radiation is incident on the detection system.

Figure 2:
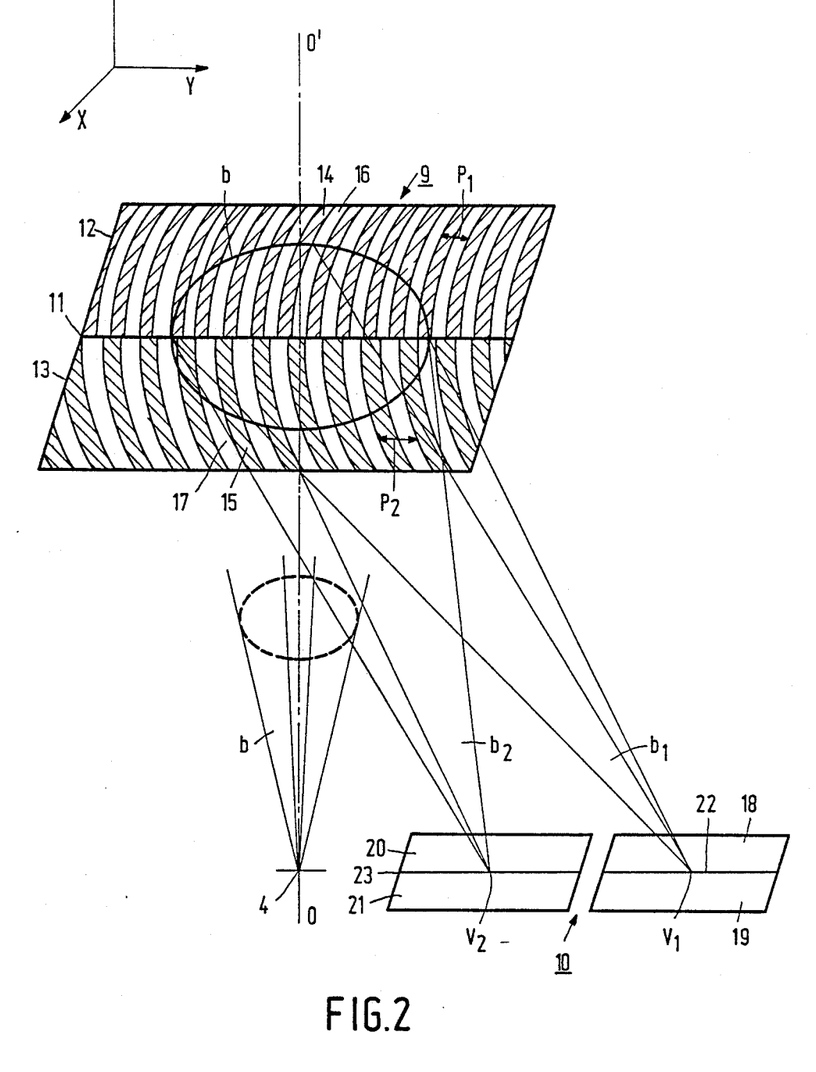
FIG. 2 is a perspective diagrammatical view of a first embodiment of the diffraction grating and the associated detection system.

FIG. 2 is a perspective elevational view of a first embodiment of the grating 9 and the radiation-sensitive detection system 10. The beam b is indicated by its cross-section at the area of the grating. The grating 9 comprises two sub-gratings 12 and 13 separated from each other by the line 11. The grating strips of the sub-gratings 12 and 13 are denoted by 14 and 15, respectively. These grating strips are separated by intermediate strips 16 and 17. In this embodiment the grating strips at the area of the separating line 11 have the same direction and are, for example perpendicular to the bounding line. The average grating period $p_1$ of the sub-grating 12 is, however, different from the average grating period $p_2$ of the sub-grating 13. Consequently, the angle at which the sub-beam $b_2$ is deflected differs from the angle at which the sub-beam $b_1$ is deflected. This means that in the plane of the detectors the radiation spots $V_1$ and $V_2$ are offset with respect to each other in the Y direction.

Figure 3A:
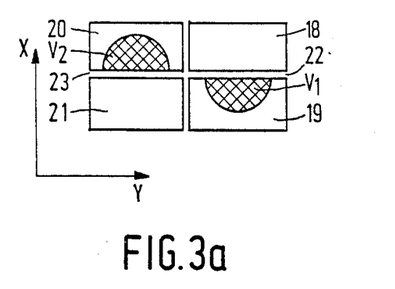
FIGS. 3a and 3b show the variations of the radiation spots on the detectors upon the occurrence of focussing errors
Figure 3B:
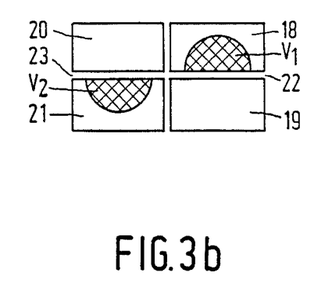

Radiation-sensitive detectors in the form of photodiodes 18, 19 and 20, 21 which are separated by narrow strips 22 and 23, respectively, are associated with each of the sub-beams $b_1$ and $b_2$. These detectors are positioned in such a way that in the case of a correct focussing of the beam b on the information surface 2 the intensity distribution of the radiation spots $V_1$ and $V_2$ formed by the sub-beams $b_1$ and $b_2$ is symmetrical relative to the detectors 18, 19 and 20, 21, respectively. When a focussing error occurs, the radiation spots $V_1$ and $V_2$ become asymmetrically broader as is shown in FIGS. 3a and 3b. FIG. 3a shows the situation in which the beam b is focussed in a plane in front of the information surface 2, whereas FIG. 3b relates to the situation in which the beam b is focussed in a plane behind the information surface.

If the output signals of the detectors 18, 19, 20 and 21 are represented by $S_{18} S_{19}$, $S_{20}$ and $S_{21}$, respectively, the focussing error signal will be given by $$S_f = (S_{18} + S_{21}) - (S_{19} + S_{20})$$

A signal which is proportional to the information being read, or the information signal $S_i$ is given by:

$$S_i = S_{18} + S_{19} + S_{21}$$

If the bounding line 11 of the two sub-gratings 12 and 13 extends parallel to the direction of a track 3 being read, it is also possible to generate a tracking error signal $S_r$ from the detector signals. This signal is given by:

$$S_r = (S_{18} + S_{19}) - (S_{20} + S_{21})$$

The apparatus can be dimensioned and the geometry of the composite grating and the wavelength of the scanning beam can be adapted to each other in such a way that, if the plane in which the scanning beam b is focussed coincides with the information plane 2, the sub-beams $b_1$ and $b_2$ are focussed on the separating strips of the photodiode pairs 18, 19, 20 and 21. Then the size of the radiation spots $V_1$ and $V_2$ is minimum and the intensity distribution of each spot is symmetrical with respect to the associated detector pair.

When varying the wavelength of the scanning beam, the angles at which the sub-beams are deflected by the subgratings will vary. For each sub-beam this means not only that the position where the chief ray of this sub-beam is incident on the associated photodiode pair is displaced, but also that this sub-beam is focussed in a plane which is located below or above the radiation sensitive surface of the photodiode pair.

Figure 4A:
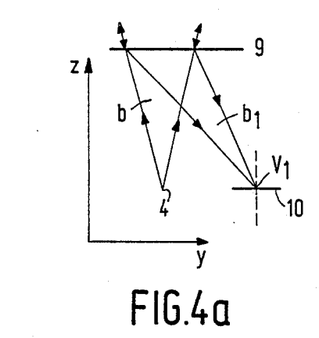
FIGS. 4a, 4b, 4c show the variations of the subbeams upon the occurrence of a wavelength variation of the scanning beam.
Figure 4B:
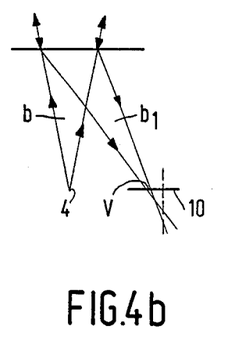
Figure 4C:
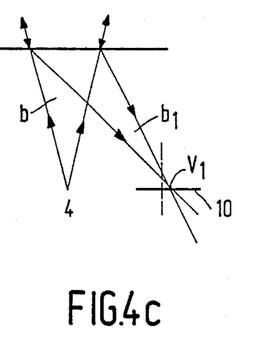

This is illustrated in FIGS. 4a, 4b and 4c for the sub-beam $b_1$. An analogous effect occurs for the sub-beam $b_2$. In these Figures the reference numeral 9 again denotes the composite grating, the reference numeral 4 denotes the diode laser and the reference numeral 10 denotes the surface of the composite photodiode. FIG. 4a shows the situation in which the wavelength has the correct, or nominal value. In the situation shown in FIG. 4b the wavelength is smaller than the nominal value and the sub-beam is focussed in a plane below the radiation-sensitive surface 10 of the photodiodes. If the wavelength is larger than the nominal value, the sub-beam is focussed in a plane above the radiation-sensitive surface of the photodiodes, as is shown in FIG. 4c. A defocussing of the sub-beam $b_1$ does not only result in the radiation spot $V_1$ formed on the radiation sensitive surface of the photodiodes becoming bigger but also in this spot acquiring an asymmetrical shape. In fact, the sub-beam $b_1$ originates from the sub-grating 12 located in FIG. 2 above the separating line 11. This separating line bisects the exit pupil of the objective system 6 and hence also the scanning beam b reflected by the information surface 2 so that the cross-section of the sub-beam $b_1$ is semi-circular. The radiation spot $V_1$ is therefore not round and upon defocussing of the sub-beam $b_1$ this spot has an approximately semi-circular shape.

Figure 5:
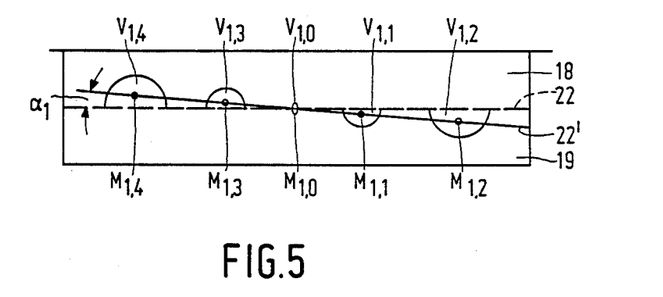
FIG. 5 shows the changes, introduced by these variations, of a radiation spot formed on a photodiode pair.

FIG. 5 illustrates how the position, the shape and the size of the radiation spot $V_1$ change when the wavelength of the scanning beam is varied. It has been assumed that this beam is sharply focussed on the information plane. $V_{1,0}$ is the radiation spot which is formed if the wavelength has the nominal value and if the sub-beam $b_1$ is sharply focussed on the radiation-sensitive surface of the detectors 18 and 19. When increasing the wavelength, the radiation spot moves to the right and this spot becomes bigger and bigger, which is indicated by the spots $V_{1,1}$, $V_{1,2}$. If the wavelength becomes smaller than the nominal value, the radiation spot moves to the left and this spot also becomes bigger and bigger, which is indicated by the spots $V_{1,3}$ and $V_{1,4}$. The centres of the intensity distribution of the spots $V_{1,0}$, $V_{1,1}$, $V_{1,2}$, $V_{1,3}$ and $V_{1,4}$ are denoted by $M_{1,0}$, $M_{1,1}$, $M_{1,2}$, $M_{1,3}$ and $M_{1,4}$. These centres are located on a line 22′ which extends at a small angle $\alpha_1$ of the order of several degrees to the original separating strip 22 of the detectors 18 and 19. An analogous effect occurs for the radiation spot $V_2$, with the line along which the centre of the intensity distribution is displaced extending at an angle to the separating strip 23, which angle is opposite to and has a different value than the angle $\alpha_1$.

The result of a wavelength variation thus is that the centre of the intensity distribution of the radiation spots $V_1$ and $V_2$, is displaced transversely to the separating strips 22 and 23, respectively, and hence the detectors 18, 19 and 20, 21, respectively, receive different radiation intensities. The output signals of the detectors 18, 19 and 20, 21 are then no longer equal even though the scanning beam is sharply focussed on the information plane. The focus servo-system therefore starts to correct the focussing of the scanning beam, for example, by moving the objective system along the optical axis until these output signals are equal again. Then, however, the scanning beam is no longer correctly focussed on the information plane.

It has been found that in a given embodiment of the apparatus a wavelength variation of 20 nm at a nominal wavelength of 785 nm caused a defocussing of the order of 0.7 to 0.8 μm, which is a major part of the permitted total focussing error of, for example, 1 μm.

Figure 6:
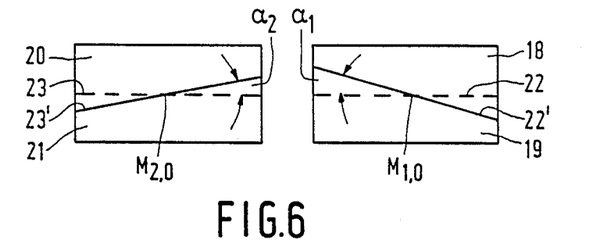
FIG. 6 shows the radiation-sensitive detection system according to the invention, associated with the first embodiment of the diffraction grating.

In order to eliminate the influence of wavelength variations on the focussing error signal to a substantial extent, according to the invention the separating strip for each photodiode pair is located so that the displacement of the centre of the intensity distribution of the associated radiation spot falls along this strip. In FIG. 6 photodiode pairs modified in accordance with the invention are denoted by 18, 19 and 20, 21, respectively. The new separating strips are shown by means of the solid lines 22′ and 23′. As compared with the original strips 22 and 23 shown by means of broken lines, the strips 22′ and 23′ are rotated about the points $M_{1,0}$ and $M_{2,0}$ through small angles $\alpha_1$ and $\alpha_2$, respectively.

Figure 7:
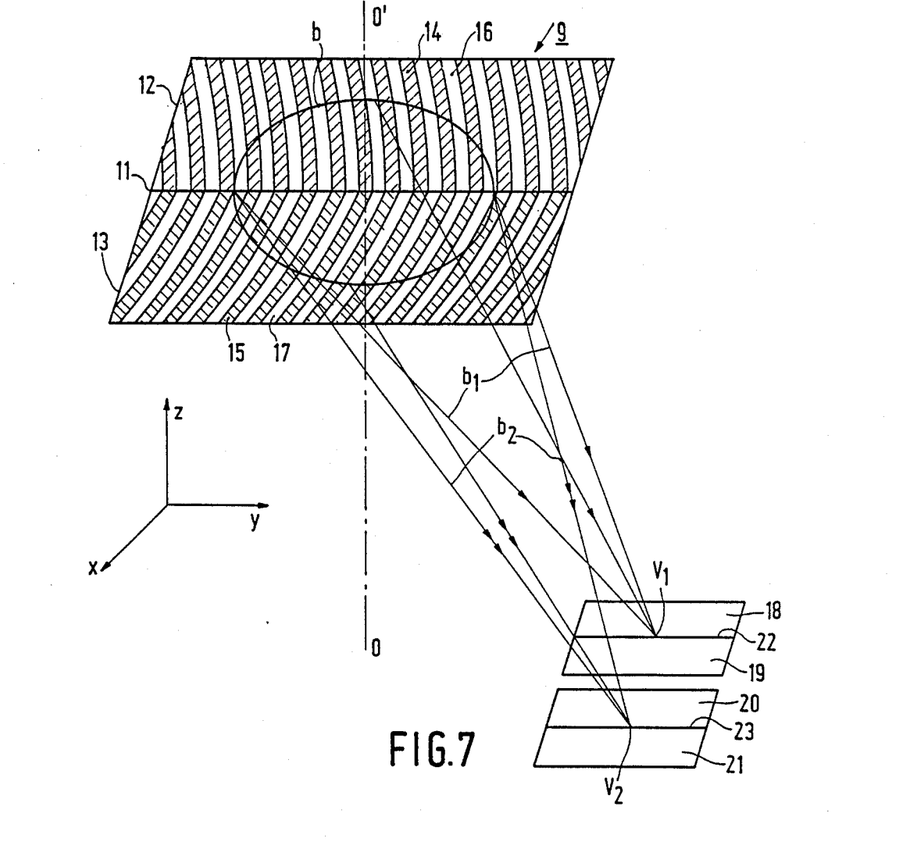
FIG. 7 shows a second embodiment of the diffraction grating and the associated radiation-sensitive detection system.

FIG. 7 diagrammatically shows a second embodiment of the composite diffraction grating and the associated photodiode configuration. The sub-gratings now have the same grating period, but the main directions of the curved grating strips 14 of the sub-grating 12 extend at a first angle to the separating line 11, whilst the main directions of the curved grating strips 15 of the second sub-grating 13 extend at a second, preferably equally large but opposite angle to the separating line. The sub-beams are mainly deflected in a direction transversely to the main directions, so that the photodiodes must be arranged differently than in FIG. 2. The bounding strips 22 and 23 of the detector pairs in the XY-plane are now located one after the other in the X-direction. The focussing error signal, the information signal and the tracking error signal are obtained in the same way as described with reference to FIG. 2.

Since the efficiency of a diffraction grating, i.e. the quotient of the quantity of radiation deflected in the desired direction and the total quantity of radiation incident on the grating depends on, inter alia the grating period, the composite diffraction grating shown in FIG. 7 is preferred to that shown in FIG. 2. In fact, due to the unequal grating periods of the sub-gratings in the last-mentioned grating the sub-beams may acquire unequal intensities so that an offset in the tracking error signal may be produced. This type of offset cannot occur in an apparatus comprising the diffraction grating as shown in FIG. 7.

Figure 8A:
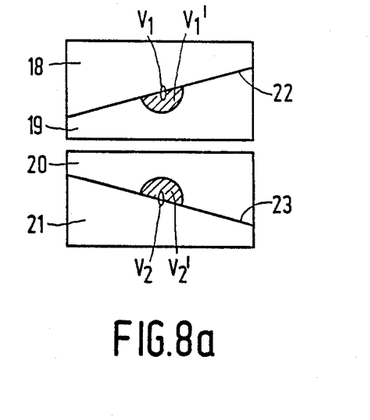
FIGS. 8a and 8b show the variations of the radiation spots on the photodiodes upon the occurrence of focussing errors.
Figure 8B:
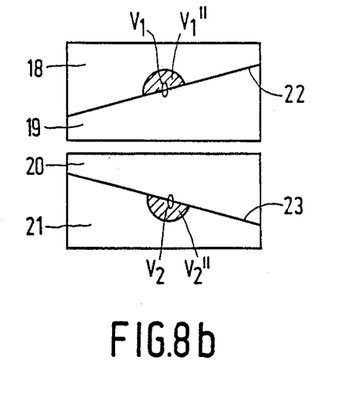

In FIGS. 8a and 8b showing the photodiode pairs according to FIG. 7 in a plan view, it has been illustrated how the radiation spots $V_1$ and $V_2$ are located with respect to the separating strips 22 and 23. In the case of a correct focussing of the scanning beam on the information plane and of the sub-beams on the detector surface the radiation spots $V_1$ and $V_2$ are minimal and are located on the separating strips 22 and 23. FIG. 8a shows the radiation spots $V_1'$ and $V_2'$ which are produced if the scanning beam is focussed in a plane in front of the information surface, whilst FIG. 8b shows the radiation spots $V_1''$ and $V_2''$ which are produced if the scanning beam is focussed in a plane behind the information surface.

Figure 9:
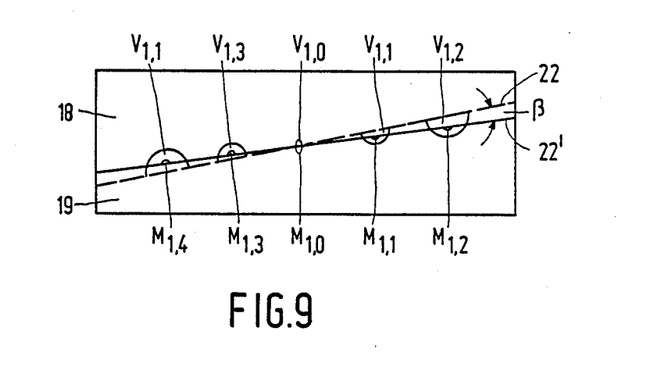
FIG. 9 shows the variations of a radiation spot formed on a photodiode pair due to a variation of the wavelength of the scanning beam and FIG. 10 shows the radiation-sensitive detection system according to the invention, associated with the second embodiment of the diffraction grating.

Analogously as in FIG. 5, FIG. 9 shows how the position, the shape and the size of the radiation spot $V_1$ change when varying the wavelength of the scanning beam. FIG. 9 does not require any further explanation after the description of FIG. 5.

Figure 10:
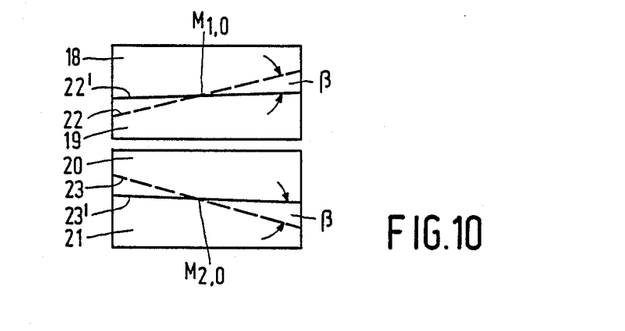

FIG. 10 shows the photodiode pairs 18, 19 and 20, 21 used in the arrangement of FIG. 7 and modified in accordance with the invention. With respect to the original strips 22 and 23, the new separating strips 22′ and 23′ are rotated through a small angle $\beta$ about the points $M_{1,0}$ and $M_{2,0}$, the centres of the intensity distributions of the radiation spots $V_1$ and $V_2$ in the case of correct focussing of the scanning beam on the information plane and in the case of the nominal wavelength. It is to be noted that the sign of the angle $\beta$ is determined by the geometry of the apparatus, notably the mutual positions of the diode laser and the grating and those of the diode laser and the detectors. It is alternatively possible for the lines 22′ and 23′ to be turned counterclockwise and clockwise with respect to the lines 22 and 23, respectively, instead of clockwise and counterclockwise, respectively as in FIG. 10.

The invention may be used in any focussing error detection system in which a diffraction element is used for separating the beam reflected by the information plane from the beam emitted by the diode laser and for splitting the reflected beam into a plurality of sub-beams. In practice, two sub-beams are generally used which are formed by means of two sub-gratings. Under some circumstances it may be desirable to use a composite grating having more than two sub-gratings, so that more than two sub-beams are formed. The measure according to the invention may be taken for each detector pair associated with these sub-beams. The sub-gratings may have straight grating lines and a constant grating period. However, a type of grating, also referred to as holograms, whose embodiments are shown in FIGS. 2 and 7 is preferably used. The sub-gratings in these embodiments have a varying grating period, with the variation in the period being, for example, of the order of several percent of the average grating period. Besides, as is shown in FIGS. 2 and 7, the grating strips of the two sub-gratings are curved. Thus, these sub-gratings have a variable lens action. Due to the varying grating period the positions of the radiation spots $V_1$ and $V_2$ can be varied by displacing the grating 9 in its own plane. Aberrations in a direction perpendicular to the direction of the separating line 11 may be minimized by the curvatures of the grating strips. The possibility of displacing the positions of the radiation spots $V_1$ and $V_2$ is particularly important if an integrated lased-photodiode unit is used, i.e. a component in which the diode laser and the photodiodes are arranged on one support and are therefore fixed with respect to each other and thus have a fixed mutual distance in the Z-direction. This distance is subject to manufacturing tolerances and cannot be corrected during assembly of the apparatus by displacing the photodiodes with respect to the laser diode in the Z-direction.

Also the distance in the Y-direction between the diode laser and the centres of the detector pairs is subject to manufacturing tolerances. A compensation therefor can also be obtained by displacing the grating 9 in the direction of the line 11.

In the embodiment according to FIG. 2 it can be ensured that, in spite of the different angles at which the sub-beams $b_1$ and $b_2$ are deflected in the YZ-plane due to the different average grating periods of the sub-gratings 12 and 13, the foci of the sub-beams are in one XY-plane, namely by giving the grating periods and the curvatures of the grating strips of corresponding parts of the sub-gratings a different variation.

An important advantage of the diffraction grating having curved grating strips as compared with a grating having straight grating strips is that the optical aberrations such as coma and astigmatism, which may occur when using the last-mentioned grating, can be avoided in the first-mentioned grating by taking these aberrations into account in the manufacture of this grating and by adapting the curvatures of the grating strips thereto.

The invention has been described for use in a read apparatus, but it may alternatively be used in a write apparatus or in a combined write/read apparatus in which during recording the focussing and the tracking of the write beam are monitored. The focussing error detection system described does not utilize special properties of the information surface 2. It is merely necessary and adequate that this surface is reflecting. Therefore the invention may be used in various apparatus where very accurate focussing is required, for example in microscopes, in which case the tracking error detection may be dispensed with.

What is claimed is:

1. An apparatus for optically scanning a radiation-reflective information surface, which apparatus comprises a diode laser supplying a scanning beam, an objective lens for focusing the scanning beam into a scanning spot on the information surface and for re-imaging the radiation beam reflected from such surface onto a composite radiation-sensitive detection system comprising a plurality of pairs of photodetectors, and a diffraction element comprising a plurality of sub-gratings arranged in the radiation path between said laser and said lens for deflecting the reflected radiation beam to said radiation-sensitive detection system and splitting it into a plurality of sub-beams forming respective asymmetric radiation spots on the respective pairs of photodetectors, the relative outputs of said photodetectors controlling the focusing of said scanning beam on said information surface;

characterized in that the two photodetectors in each of said pairs are separated by a separating strip extending at an acute angle to a line along which the asymmetric radiation spot formed on such pair is displaced by variations in the wavelength of said scanning beam;

said angle being such that said separating strip is on the line along which the center of the intensity distribution of such radiation spot is displaced by variations in the wavelength of said scanning beam when said scanning beam is correctly focused on said information surface;

whereby variations in the wavelength of said scanning beam do not alter the relative outputs of said photodetectors and thereby do not affect the focusing of said scanning beam on said information plane.

2. An apparatus as claimed in claim 1, in which said diffraction element is constituted by two sub-gratings having the same grating period and separated by a separation line therebetween, the grating strips of the first sub-grating extending at a first angle with respect to the separation line, the grating strips of the second sub-grating extending at a second angle with respect to said separation line, which second angle is equal but opposite to said first angle;

and wherein there are two pairs of photodetectors which are juxtaposed in a direction transverse to the direction of said sub-grating separation line;

characterized in that the separating strips of the two photodetector pairs each extend at equal but opposite angles with respect to said line along which the asymmetric radiation spot on the relevant pair is displaced by variations in the wavelength of said scanning beam.

3. An apparatus as claimed in claim 1, characterized in that the sub-gratings have a varying grating period and in that the grating strips are curved.

4. An apparatus as claimed in claim 1 or 3 in which the diffraction element is constituted by two sub-gratings in which the grating strips of one sub-grating extend in the same direction as those of the other sub-grating but the periods of the sub-gratings are different, and there are two pairs of photodetectors which are juxtaposed in a direction parallel to the separating line between the sub-gratings; characterized in that the separating strips of the photodetector pairs extend at opposite angles with respect to said line along which the asymmetric radiation spot formed on the relevant pair is displaced by variations in the wavelength of said scanning beam.

* * * * *